(12) United States Patent
Moncarz et al.

(10) Patent No.: US 10,954,924 B2
(45) Date of Patent: Mar. 23, 2021

(54) GEOTHERMAL HEAT HARVESTERS

(71) Applicant: Geothermic Solution, LLC, Palo Alto, CA (US)

(72) Inventors: Piotr D. Moncarz, Palo Alto, CA (US); Walter R. Kolbe, Pacifica, CA (US); Louis E. Capuano, Jr., Santa Rosa, CA (US); Keanen Ryan, Chicago, IL (US)

(73) Assignee: GEOTHERMIC SOLUTION, LLC, Palo Alto, CA (US)

( * ) Notice: Subject to any disclaimer, the term of this patent is extended or adjusted under 35 U.S.C. 154(b) by 0 days.

(21) Appl. No.: 15/935,241

(22) Filed: Mar. 26, 2018

(65) Prior Publication Data
US 2018/0274524 A1 Sep. 27, 2018

Related U.S. Application Data

(63) Continuation of application No. PCT/US2016/053569, filed on Sep. 23, 2016.

(60) Provisional application No. 62/232,271, filed on Sep. 24, 2015.

(51) Int. Cl.
| | | |
|---|---|---|
| *F03G 7/04* | (2006.01) | |
| *F24T 10/20* | (2018.01) | |
| *F24T 10/13* | (2018.01) | |
| *E21B 43/30* | (2006.01) | |
| *E21B 7/04* | (2006.01) | |

(Continued)

(52) U.S. Cl.
CPC ............... *F03G 7/04* (2013.01); *E21B 7/04* (2013.01); *E21B 43/305* (2013.01); *F24T 10/10* (2018.05); *F24T 10/13* (2018.05); *F24T 10/15* (2018.05); *F24T 10/20* (2018.05); *Y02E 10/10* (2013.01)

(58) Field of Classification Search
CPC ... F03G 7/04; F24T 10/10; F24T 10/13; F24T 10/15; F24T 10/20; E21B 43/305; E21B 7/04; Y02E 10/125; Y02E 10/14
USPC .............................................. 60/641.2–641.4
See application file for complete search history.

(56) References Cited

U.S. PATENT DOCUMENTS

| | | |
|---|---|---|
| 2,438,720 A | 3/1948 | Smith |
| 2,461,449 A | 2/1949 | Smith et al. |
| 2,513,373 A | 7/1950 | Sporn et al. |

(Continued)

FOREIGN PATENT DOCUMENTS

| | | |
|---|---|---|
| CN | 104713259 A | 6/2015 |
| DE | 102010006141 A1 | 8/2011 |

(Continued)

OTHER PUBLICATIONS

Chen, Lea-Der. Heat Transfer Model Estimating Energy Extraction from a Closed-Loop Geothermal System. Presented at Power Plays: Geothermal Energy in Oil and Gas Fields. Conference & Workshop. SMU Campus, Dallas, Texas. Apr. 25-26, 2016. 1 page.

(Continued)

*Primary Examiner* — Hoang M Nguyen
(74) *Attorney, Agent, or Firm* — Wilson Sonsini Goodrich & Rosati

(57) ABSTRACT

Thermal energy is extracted from geological formations using a heat harvester. In some embodiments, the heat harvester is a once-through, closed loop, underground heat harvester created by directionally drilling through hot rock. The extracted thermal energy can be converted or transformed to other forms of energy.

15 Claims, 7 Drawing Sheets

(51) Int. Cl.
*F24T 10/10* (2018.01)
*F24T 10/15* (2018.01)

(56) References Cited

U.S. PATENT DOCUMENTS

| | | | |
|---|---|---|---|
| 2,707,095 A | 4/1955 | Parsons et al. | |
| 3,274,769 A | 9/1966 | Reynolds | |
| 3,386,508 A * | 6/1968 | Bielstein | E21B 43/24 |
| | | | 166/272.3 |
| 3,470,943 A | 10/1969 | Allen | |
| 3,857,244 A | 12/1974 | Faucette | |
| 4,051,677 A | 10/1977 | Van Huisen | |
| 4,112,745 A | 9/1978 | McCabe et al. | |
| 4,201,060 A | 5/1980 | Outmans | |
| 4,255,933 A | 3/1981 | Bailey et al. | |
| 4,512,156 A | 4/1985 | Nagase | |
| 4,538,673 A | 9/1985 | Partin et al. | |
| 4,574,875 A | 3/1986 | Rawlings et al. | |
| 4,644,750 A | 2/1987 | Lockett et al. | |
| 4,715,429 A | 12/1987 | Mogensen | |
| 4,776,169 A | 10/1988 | Coles, Jr. | |
| 4,852,666 A * | 8/1989 | Brunet | E21B 7/061 |
| | | | 175/61 |
| 4,912,941 A | 4/1990 | Buechi | |
| 5,072,783 A | 12/1991 | Ayala Martinez et al. | |
| 5,203,173 A | 4/1993 | Horton | |
| 5,311,741 A | 5/1994 | Blaize | |
| 5,515,679 A | 5/1996 | Shulman | |
| 5,816,314 A | 10/1998 | Wiggs et al. | |
| 5,992,507 A | 11/1999 | Peterson et al. | |
| 6,000,471 A | 12/1999 | Langset | |
| 6,073,448 A | 6/2000 | Lozada | |
| 6,247,313 B1 | 6/2001 | Moe et al. | |
| 6,301,894 B1 | 10/2001 | Halff | |
| 6,668,554 B1 | 12/2003 | Brown | |
| 6,679,326 B2 | 1/2004 | Zakiewicz | |
| 6,708,494 B1 | 3/2004 | Hamann | |
| 6,969,123 B2 * | 11/2005 | Vinegar | E21B 43/006 |
| | | | 166/302 |
| 7,146,823 B1 | 12/2006 | Wiggs | |
| 7,251,938 B1 | 8/2007 | Bond | |
| 8,020,382 B1 | 9/2011 | Zakiewicz | |
| 8,176,971 B2 | 5/2012 | McClung, III | |
| 8,201,409 B1 | 6/2012 | Zakiewicz | |
| 8,307,896 B2 | 11/2012 | Sarria | |
| 8,381,523 B2 | 2/2013 | Eli et al. | |
| 8,616,000 B2 | 12/2013 | Parrella | |
| 8,701,770 B2 * | 4/2014 | Schultz | E21B 36/02 |
| | | | 166/272.7 |
| 8,708,046 B2 | 4/2014 | Montgomery et al. | |
| 8,991,488 B2 | 3/2015 | Loveday et al. | |
| 9,121,393 B2 | 9/2015 | Schwarck | |
| 2007/0245729 A1 | 10/2007 | Mickleson | |
| 2010/0276115 A1 * | 11/2010 | Parrella | F24T 10/30 |
| | | | 165/45 |
| 2011/0048005 A1 | 3/2011 | McHargue | |
| 2011/0061382 A1 | 3/2011 | Stern | |
| 2011/0100002 A1 | 5/2011 | Muir et al. | |
| 2011/0247816 A1 | 10/2011 | Carter, Jr. | |
| 2012/0080163 A1 | 4/2012 | Hoffman | |
| 2012/0174581 A1 | 7/2012 | Vaughan et al. | |
| 2013/0255258 A1 | 10/2013 | Loveday | |
| 2013/0299036 A1 | 11/2013 | Loveday | |
| 2013/0338835 A1 | 12/2013 | Pepe | |
| 2014/0326668 A1 | 11/2014 | Loveday | |

FOREIGN PATENT DOCUMENTS

| | | |
|---|---|---|
| JP | 2004522071 A | 7/2004 |
| JP | 2007040635 A | 2/2007 |
| JP | 2011524484 A | 9/2011 |
| WO | WO-9822760 A1 | 5/1998 |
| WO | WO-2012068279 A2 | 5/2012 |
| WO | WO-2014081911 A2 | 5/2014 |
| WO | WO-2014182732 A1 | 11/2014 |
| WO | WO-2015030601 A1 | 3/2015 |
| WO | WO-2015134974 A1 | 9/2015 |
| WO | WO-2015192011 A1 | 12/2015 |
| WO | WO-2017053884 A1 | 3/2017 |

OTHER PUBLICATIONS

GreenFire Energy. About ECO2G. Webpage. Copyright 2016. Accessed Sep. 28, 2016. 2 pages. URL:< http://www.greenfireenergy.com/about-eco2g.html>.

GreenFire Energy. Advisory Board. Webpage. Copyright 2016. Accessed Sep. 28, 2016. 3 pages. URL:< http://www.greenfireenergy.com/advisory-board.html>.

GreenFire Energy. Blog. Webpage. Copyright 2016. Accessed Sep. 28, 2016. 2 pages. URL:<http://www.greenfireenergy.com/blog1.html>.

GreenFire Energy. Contact. Webpage. Copyright 2016. Accessed Sep. 28, 2016. 2 pages. URL:< http://www.greenfireenergy.com/contact.html>.

GreenFire Energy. ECO2G Reinvents Geothermal. Webpage. Copyright 2016. Accessed Sep. 28, 2016. 2 pages. URL:< http://www.greenfireenergy.com/eco2g-reinvents-geothermal.html>.

GreenFire Energy. FAQs. Webpage. Copyright 2016. Accessed Sep. 28, 2016. 3 pages. URL:< http://www.greenfireenergy.com/faqs.html>.

GreenFire Energy. Geothermal Potential. Webpage. Copyright 2016. Accessed Sep. 28, 2016. 2 pages. URL:< http://www.greenfireenergy.com/geothermal-potential.html>.

GreenFire Energy. Geothermal Technologies Compared. Webpage. Copyright 2016. Accessed Sep. 28, 2016. 3 pages. URL:< http://www.greenfireenergy.com/geothermal-technologies-compared.html>.

GreenFire Energy. Home. Webpage. Copyright 2016. Accessed Sep. 28, 2016. 3 pages. URL:< http://www.greenfireenergy.com/>.

GreenFire Energy. Management Team. Webpage. Copyright 2016. Accessed Sep. 28, 2016. 3 pages. URL:< http://www.greenfireenergy.com/management-team.html>.

GreenFire Energy. Power, Not Problems. Webpage. Copyright 2016. Accessed Sep. 28, 2016. 2 pages. URL:< http://www.greenfireenergy.com/power-not-problems.html>.

GreenFire Energy. Research Partners. Webpage. Copyright 2016. Accessed Sep. 28, 2016. 2 pages. URL:< http://www.greenfireenergy.com/research-partners.html>.

GreenFire Energy. Research. Webpage. Copyright 2016. Accessed Sep. 28, 2016. 2 pages. URL:< http://www.greenfireenergy.com/research.html>.

GreenFire Energy. The Climate and Water Imperative. Webpage. Copyright 2016. Accessed Sep. 28, 2016. 2 pages. URL:< http://www.greenfireenergy.com/the-climate-and-water-imperative.html>.

GreenFire Energy. Why is ECO2G Better?. Webpage. Copyright 2016. Accessed Sep. 28, 2016. 2 pages. URL:< http://www.greenfireenergy.com/why-is-eco2g-better.html>.

Hasan, et al. An Environmentally Friendly Closed-Loop Geothermal Energy Extraction System. Presented at Power Plays: Geothermal Energy in Oil and Gas Fields. Conference & Workshop. SMU Campus, Dallas, Texas. Apr. 25-26, 2016. 17 pages.

Higgins, et al. Process Modeling of a Closed-Loop SCO2 Geothermal Power Cycle. The 5th International Supercritical CO2 Power Cycles Symposium. San Antonio, Texas. Mar. 29-31, 2016. 12 pages.

InnerGeo. Contact Us. Webpage. Copyright 2015. Accessed Sep. 28, 2016. 3 pages. URL:< http://www.innergeo.com/index.php/contact-us>.

InnerGeo. Dr Harvey Knull. Webpage. Copyright 2015. Accessed Sep. 28, 2016. 2 pages. URL:<http://www.innergeo.com/index.php/about/dr-harvey-knull>.

InnerGeo. Dr. LD Chen Researcher. Webpage. Copyright 2015. Accessed Sep. 28, 2016. 19 pages. URL:< http://www.innergeo.com/index.php/about/dr-ld-chen>.

(56) References Cited

OTHER PUBLICATIONS

InnerGeo. Home. Webpage. Copyright 2015. Accessed Sep. 28, 2016. 3 pages. URL:< http://www.innergeo.com/>.

InnerGeo. InnerGeo Power. Webpage. Copyright 2015. Accessed Sep. 28, 2016. 6 pages. URL:< http://www.innergeo.com/index.php/innergeo-power>.

InnerGeo. J Paul Mueller Jr CEO. Webpage. Copyright 2015. Accessed Sep. 28, 2016. 4 pages. URL:< http://www.innergeo.com/index.php/about/j-paul-mueller-jr-ceo>.

InnerGeo. Our Team. Webpage. Copyright 2015. Accessed Sep. 28, 2016. 2 pages. URL:< http://www.innergeo.com/index.php/about>.

InnerGeo. Rashid Hasan Researcher. Webpage. Copyright 2015. Accessed Sep. 28, 2016. 18 pages. URL:< http://www.innergeo.com/index.php/about/rashid-hasan>.

InnerGeo. Rick Hay CTO. Webpage. Copyright 2015. Accessed Sep. 28, 2016. 2 pages. URL:< http://www.innergeo.com/index.php/about/rick-hay-cto>.

InnerGeo. Ron Loveday President. Webpage. Copyright 2015. Accessed Sep. 28, 2016. 2 pages. URL:< http://www.innergeo.com/index.php/about/ron-loveday>.

InnerGeo. WaterReco. Webpage. Copyright 2015. Accessed Sep. 28, 2016. 3 pages. URL:< http://www.innergeo.com/index.php/waterreco>.

International Search Report and Written Opinion dated Dec. 30, 2016 for International PCT Patent Application No. PCT/US2016/053569.

Islam, et al. An Efficient Closed-Loop Geothermal Energy Extraction System. Presented at Power Plays: Geothermal Energy in Oil and Gas Fields. Conference & Workshop. SMU Campus, Dallas, Texas. Apr. 25-26, 2016. 1 page.

Oldenburg, et al. Numerical Simulation of Critical Factors Controlling Heat Extraction from Geothermal Systems Using a Closed-Loop Heat Exchange Method. Proceedings, 41st Workshop on Geothermal Reservoir Engineering, Stanford University. Feb. 22-24, 2016. 8 pages.

EP16849806.1 European Search Report dated Apr. 3, 2019.

\* cited by examiner

GEOTHERMAL HEAT HARVESTERS

CROSS-REFERENCE

This application is a continuation of PCT Application No. PCT/US2016/053569, filed Sep. 23, 2016, which claims the benefit of provisional U.S. Application No. 62/232,271, filed on Sep. 24, 2015, each of which is entirely incorporated herein by reference.

BACKGROUND

Conventional hydrothermal geothermal energy may be extracted from the earth by drilling a well into an underground aquifer which has been heated by a co-located magmatic intrusion. The heated water may be extracted from the aquifer in the form of steam, heated brine, or a mixture of both, and is typically used to generate electricity. While high temperature rock (e.g., above 200° C.) exists pervasively in the earth's crust within commercially accessible depths (e.g., within 10 km), such resources may be only rarely co-located with natural underground reservoirs of water. Hydrothermal geothermal resources may also be subject to a depleting water inventory unless such inventory is replenished by reinjecting fluids, which poses difficulties in regions where the water supply is limited.

The rarity of a naturally co-located heat and fluid resource has led to the development of engineered, or enhanced, geothermal systems (EGS). EGS may create a network of cracks within a body of hot rock through hydraulic fracturing, and then introduce water into the newly created cracks to extract the heat from the rock. The advantage of EGS is that water reservoirs may be artificially created within a geological heat resource. However, EGS suffers from difficulties in controlling the fracture network pathway, from a loss of injected fluid, from leaching of minerals from the rock, and from declining heat extraction due to the rapid local cooling of rock around the fractures.

SUMMARY

Recognized herein is a need for improved systems and methods for extracting heat from geological formations (also "geothermal heat harvesting" herein). The present disclosure provides closed loop systems for generating geothermal power by extracting heat from a body of rock, such as by drilling a borehole and encasing it with a pipe system and subsequently directing a working fluid (e.g., water) through the pipe system. The surrounding rock transfers heat to at least a portion of the pipe system. Cold working fluid is directed (e.g., pumped) into the pipe system and heated up by the surrounding rock as it flows through a heat harvesting portion of the pipe system. Such systems can advantageously keep the working fluid contained within a closed loop, with reduced or minimal risk of loss of the working fluid to the surrounding rock and substantially none of the environmental issues associated with water extraction from rock formations.

In some embodiments, a once-through, closed loop, underground heat harvester (also "heat harvester" herein) is created by directionally drilling at least a portion of the heat harvester through hot rock. Two or more independently drilled portions of the heat harvester (e.g., comprising two or more independently drilled well portions) can be connected with one or more couplings to create a complete loop of the underground heat harvester. Conductive cement or grout can be used to increase or improve flow of heat into the heat harvester. For example, conductive cement or grout can be used to increase or improve flow of heat into the heat harvester in a primary heat transfer region. Insulating cement or grout can be used to decrease or prevent loss of heat from the heat harvester whenever the fluid is hotter than the surrounding rock. Directional drilling can allow heat extraction to be increased or maximized by creating a heat harvester with sufficient length (and/or width) within a high temperature portion of the target formation. A field of heat harvesters can be shaped in various ways to increase or maximize heat extraction as a system. Heat harvesters may be directionally drilled through rock with known high conductivity to increase or maximize thermal production. Heat harvesters of the disclosure can be used, for example, to sustainably extract thermal energy (also "heat" herein) from geological formations. The extracted thermal energy can be converted or transformed to other forms of energy.

An aspect of the disclosure relates to a geothermal heat harvesting system, comprising a closed fluid flow path having a first segment, a second segment and a third segment, wherein the first segment, second segment and third segment are disposed below a surface such that, during use, a working fluid is directed through the closed fluid flow path along a direction that includes, in sequence, the first segment, second segment and third segment, wherein the closed fluid flow path includes a fluid entrance and a fluid exit that may be co-located at the surface, and wherein (i) the second segment may be substantially free of thermal insulation, (ii) the third segment may be thermally insulated, and (iii) the first segment and third segment may be oriented at an angle greater than about 0° with respect to the second segment.

In some embodiments, the second segment of the geothermal heat harvesting system comprises a conductive cement or grout. In some embodiments, the third segment of the geothermal heat harvesting system comprises an insulating cement or grout. In some embodiments, the geothermal heat harvesting system comprises one or more deviated fluid flow paths.

In some embodiments, the geothermal heat harvesting system comprises one or more turbines for generating power with the aid of thermal energy form the working fluid. In some embodiments, the geothermal heat harvesting system comprises one or more heat exchangers for extracting thermal energy from the working fluid. In some embodiments, the working fluid remains in a liquid phase in the one or more heat exchangers. In some embodiments, the one or more heat exchangers are located at the surface. In some embodiments, the thermal energy extracted from the working fluid is used for co-generation.

In some embodiments, the geothermal heat harvesting system comprises power plant equipment at the surface for industrial use of thermal energy from the working fluid. In some embodiments, the industrial use includes power generation. In some embodiments, the industrial use includes district heating.

In some embodiments, the geothermal heat harvesting system comprises a closed fluid flow path drilled through virgin rock. In some embodiments, at least a portion of the closed fluid flow path is directionally drilled. In some embodiments, at least a portion of rock surrounding the closed fluid flow path is selectively targeted.

In some embodiments, the working fluid of the geothermal heat harvesting system is directed through a closed fluid flow path without undergoing a phase change. In some embodiments, the working fluid undergoes a phase change. In some embodiments, the working fluid comprises a pressurized liquid.

In some embodiments, the geothermal heat harvesting system comprises a first segment that is substantially free of thermal insulation. In some embodiments, the system further comprises a fourth segment between the first segment and the second segment or between the second segment and the third segment.

In some embodiments, the geothermal heat harvester comprises a second segment disposed at a depth of at least about 0.5 kilometers with respect to the surface. In some embodiments this depth is substantially constant across a length of the second segment.

In some embodiments, the geothermal heat harvesting system comprises a closed fluid flow path that comprises a heat exchange region below the surface. In some embodiments, the closed fluid flow path comprises a heat exchange region below the surface with a horizontal length of a least about 500 meters. In some embodiments, the second segment of the geothermal heat harvesting system has a horizontal length of at least about 500 meters. In some embodiments, the working fluid of the geothermal heat harvesting system is directed once through the closed fluid flow path.

An aspect of the disclosure is directed to a geothermal heat harvesting system, comprising a geothermal heat harvester comprising an entrance and an exit at a surface, wherein the entrance and the exit are in fluid communication via a path. The path may comprise a first segment extending between the surface and a first depth, the first segment comprising the entrance; a second segment in fluid communication with the first segment and extending between the first depth and a second depth, the second segment being at an angle with respect to the first vertical segment of at least about 5°; a third segment at the second depth that is in fluid communication with the second segment, wherein the third segment comprises a heat transfer region; a fourth segment in fluid communication with the third segment and extending between the second depth and the first depth; and a fifth segment in fluid communication with the fourth segment and extending between the first depth and the surface, the fifth segment comprising the exit, wherein the fourth segment is at an angle with respect to the fifth segment of at least about 5°.

In some embodiments, the first segment and the fifth segment of the geothermal heat harvesting system are each substantially vertical, and the third segment is substantially horizontal.

In some embodiments, the path of the geothermal heat harvesting system comprises two independently drilled portions connected with a coupling. In some embodiments, a first of the two independently drilled portions comprises the first segment, the second segment and a first portion of the third segment, and a second of the two independently drilled portions comprises a second portion of the third segment, the fourth segment and the fifth segment. In some embodiments, the path comprises two or more independently drilled portions connected with one or more couplings.

In some embodiments, the geothermal heat harvesting system further comprises an additional geothermal heat harvester arranged in a radiator configuration with the geothermal heat harvester, the additional geothermal heat harvester comprising: a sixth segment in fluid communication with at least a portion of the second segment, the sixth segment extending between a deviation depth and the second depth and deviating from the second segment at a first angle; a seventh segment at the second depth that is in fluid communication with the sixth segment, the seventh segment being substantially horizontal, wherein the seventh segment and the third segment are spaced apart and substantially parallel; and an eighth segment in fluid communication with the seventh segment and at least a portion of the fourth segment, the eighth segment extending between the second depth and the deviation depth and deviating from the fourth segment at a second angle. In some embodiments, the first angle is substantially the same as the second angle.

In some embodiments, the path of the geothermal heat harvesting system forms a closed loop. In some embodiments, the path comprises two portions, wherein a first of the two portions comprises a well head that forms the entrance, and wherein the second of the two portions comprises a well head that forms the exit. In some embodiments, the geothermal heat harvesting system further comprises insulating cement or grout along at least a portion of the path, conductive cement or grout along at least a portion of the path, or a combination thereof. In some embodiments, the entrance and exit of the geothermal heat harvesting system are co-located. In some embodiments, the geothermal heat harvesting system further comprises a primary fluid that flows through at least a portion of the path, wherein the primary fluid enters at the entrance and exits at the exit, and wherein a flow rate of the primary fluid is controlled over life of the geothermal heat harvester such that a heat extraction rate from the geothermal heat harvester is leveled through life.

In some embodiments the geothermal heat harvesting system further comprises an additional geothermal heat harvester operating together with the geothermal heat harvester in a field configuration, the additional geothermal heat harvester having a separate path with substantially the same configuration as the path of the geothermal heat harvester. In some embodiments, the additional geothermal heat harvester is adjacent to the geothermal heat harvester, wherein the geothermal heat harvester circulates a first primary fluid and the additional geothermal heat harvester circulates a second primary fluid, and wherein the first primary fluid and the second primary fluid circulate in a counter-flow configuration with respect to each other. In some embodiments, the additional geothermal heat harvester and the geothermal heat harvester are spaced to prevent cooling overlap.

Another aspect of the disclosure is directed to a geothermal heat harvesting system, comprising a geothermal heat harvester comprising an entrance and an exit at a surface, wherein the entrance and the exit are in fluid communication via a path. The path may comprise a first segment extending between the surface and a target depth, the first segment comprising the entrance; a second segment in fluid communication with the first segment and extending radially outward at the target depth, the second segment being substantially perpendicular to the first segment; a third segment in fluid communication with the second segment and extending in an arc at the target depth; a fourth segment in fluid communication with the third segment and extending radially inward at the target depth; and a fifth segment extending between the target depth and the surface, the fifth segment comprising the exit and being substantially perpendicular to the fourth segment. The second segment, the third segment and the fourth segment together comprise a primary heat transfer region.

In some embodiments, the first segment and the fifth segment of the geothermal heat harvesting system are each substantially vertical, and the second segment and the fourth segment are each substantially horizontal.

In some embodiments, the path of the geothermal heat harvesting system comprises two independently drilled portions connected with a coupling. In some embodiments, the coupling is at the target depth. In some embodiments, the path comprises two or more independently drilled portions connected with one or more couplings. In some embodiments, the one or more couplings are at the target depth.

In some embodiments, the geothermal heat harvesting system further comprises: a sixth segment between the first segment and the second segment, the sixth segment deviating from the first segment toward the second segment; and a seventh segment between the fourth segment and the fifth segment, the seventh segment deviating from the fifth segment toward the fourth segment. In some embodiments, the geothermal heat harvesting system further comprises an additional geothermal heat harvester deviating from the geothermal heat harvester, the additional geothermal heat harvester comprising: an eighth segment in fluid communication with the first segment; a ninth segment in fluid communication with the eighth segment and extending radially outward at the target depth, the ninth segment being substantially perpendicular to the first segment and the eighth segment deviating from the first segment toward the ninth segment; a tenth segment in fluid communication with the ninth segment and extending in an arc at the target depth; an eleventh segment in fluid communication with the tenth segment and extending radially inward at the target depth, the eleventh segment being substantially perpendicular to the fifth segment; and a twelfth segment in fluid communication with the eleventh segment and the fifth segment, the twelfth segment deviating from the fifth segment toward eleventh segment. In some embodiments, the ninth segment and the eleventh segment are each substantially horizontal. In some embodiments, the horizontal portions of the geothermal heat harvester and the additional geothermal heat harvester are rotated by about 45°, 90° or 135° from each other.

In some embodiments, the path of the geothermal heat harvesting system forms a closed loop. In some embodiments, the path comprises two portions, wherein a first of the two portions comprises a well head that forms the entrance, and wherein the second of the two portions comprises a well head that forms the exit. In some embodiments, the geothermal heat harvesting system further comprises insulating cement or grout along at least a portion of the path, conductive cement or grout along at least a portion of the path, or a combination thereof. In some embodiments, the entrance and exit of the geothermal heat harvesting system are co-located. In some embodiments, the geothermal heat harvesting system further comprises a primary fluid that flows through at least a portion of the path, wherein the primary fluid enters at the entrance and exits at the exit, and wherein a flow rate of the primary fluid is controlled over life of the geothermal heat harvester such that a heat extraction rate from the geothermal heat harvester is leveled through life.

In some embodiments the geothermal heat harvesting system further comprises an additional geothermal heat harvester operating together with the geothermal heat harvester in a field configuration, the additional geothermal heat harvester having a separate path with substantially the same configuration as the path of the geothermal heat harvester. In some embodiments, the additional geothermal heat harvester is adjacent to the geothermal heat harvester, wherein the geothermal heat harvester circulates a first primary fluid and the additional geothermal heat harvester circulates a second primary fluid, and wherein the first primary fluid and the second primary fluid circulate in a counter-flow configuration with respect to each other. In some embodiments, the additional geothermal heat harvester and the geothermal heat harvester are spaced to prevent cooling overlap.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

DETAILED DESCRIPTION

Figure 1:
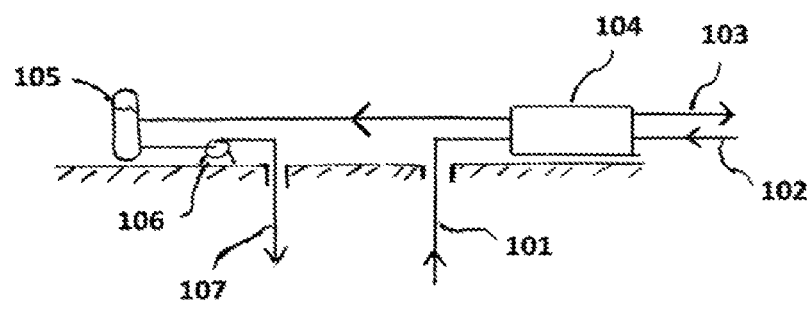
FIG. 1 is a schematic of example surface operations.
Figure 1:
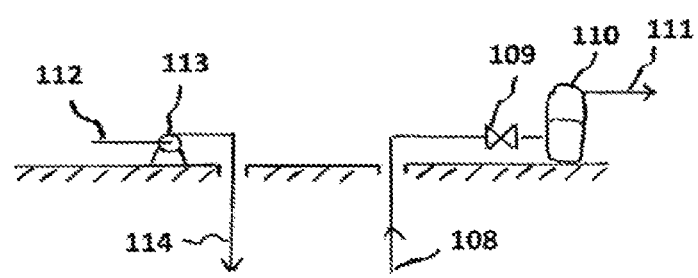

Described herein are systems and methods for extracting heat from geological formations using a geothermal heat harvester (also "heat harvester" herein). The heat harvester can comprise a casing. The heat harvester can contain a fluid (e.g., a working fluid). The casing can comprise a pipe (or pipe system) through which the heat harvesting fluid flows. The casing can form a closed fluid flow path (also "closed loop" herein). The casing can be installed inside a hole (or a system of holes) created through drilling (also "borehole" herein). The heat harvester can comprise one or more portions. For example, the heat harvester can comprise at least 1, 2, 3, 4, 5, 6, 7, 8, 9 or 10 portions. For example, the heat harvester can comprise a heat harvesting portion connected to a well portion via one or more connecting portions.

Each such portion can comprise a portion of the casing. The portions may be substantially linear or substantially non-linear (e.g., arced, angled or curved). At least a subset of the portions may be formed at least in part using directional drilling.

The well portion can comprise an entrance well portion, an exit well portion or both. For example, a well portion can comprise the entrance well portion and the exit well portion. The entrance and exit well portions can each comprise a well head. A well portion may be configured for a single heat harvester or may be shared by multiple heat harvesters.

Subsets of the portions may be grouped into larger portions. An entrance portion may comprise a well portion (e.g., an entrance well portion) and one or more connecting portions. An exit portion may comprise one or more connecting portions and a well portion (e.g., an exit well portion). In some cases, the entrance portion and/or the exit portion may (e.g., each) further comprise a portion of the heat harvesting portion. At least a subset of the portions may be joined or connected with a coupling (e.g., a coupling between the respective casings). For example, the entrance portion and the exit portion may be connected with a coupling (e.g., a coupling between two portions of the heat harvesting portion, or a coupling between a connecting portion and the heat harvesting portion).

The well portion can be the initial portion of the underground installation. The remainder of the heat harvester may be drilled from the well portion. The well portion may comprise multi-stage casing cemented or grouted in a conventional way. From the bottom of the well portion, the casing can enter into the borehole in the rock. The well portion can comprise one or more such casings. In the borehole in the rock, the casing may be surrounded by an insulating cement or grout down to a rock temperature depth referred to as "heating depth". Below the heating depth, a heat harvesting portion of the casing can collect or harvest the heat from the surrounding rock. The heat harvesting portion of the casing may be enclosed by a conductive cement or grout. At least a portion of the heat harvesting portion can extend through a primary heat transfer region. Past the primary heat transfer region, the casing may extend back up to the well portion. Above a rock temperature depth referred to as "insulation depth", the casing may be enclosed by an insulating cement or grout and may not be harvesting additional heat.

The heat harvester can comprise a closed loop heat harvester. The surrounding rock can transfer heat to the heat harvester walls (e.g., the casing in a heat harvesting portion) via, for example, conduction. A once-through design, where liquid enters at one well head, flows through a length of pipe and exits from a separate well head, may be advantageous over other methods or configurations. The heat harvester may be a once-through, closed loop, directionally drilled heat harvester. The once-through, closed loop, underground heat harvester can be directionally drilled through a geological formation (e.g., rock). The geological formation can be a high temperature rock. The heat harvester may be drilled through virgin rock.

The heat harvester can have an entrance (e.g., an inlet to the entrance well portion) and an exit (e.g., an outlet of the exit well portion). The entrance and/or the exit can be located at the rock surface. The entrance and exit of the underground heat harvester can be positioned near each other (e.g., as co-located well heads) to allow, for example, co-located operation of the system and/or a centralized drilling operation during heat harvester creation. The entrance and exit of the heat harvester may be spaced apart to allow, for example, locating the entrance near a fluid source while locating the exit near a desired heat load. A combination of co-located and spaced apart configurations may be used (e.g., when a given entrance has multiple exits).

The heat harvester can have an entrance portion and an exit portion. The entrance portion can comprise the entrance well portion. The entrance portion can further comprise one or more connecting portions. The exit portion can comprise the exit well portion. The exit portion can further comprise one or more exit well portions.

Extraction of heat from the earth's crust can be accomplished by the flow (e.g., pumped and/or through natural circulation) of a working fluid (e.g., a liquid working fluid, such as, for example, pressurized water or a long-chain hydrocarbon) into a closed loop heat harvester installed in rock of elevated temperature. The fluid can be injected (e.g., at the rock surface) at a low temperature, be gradually heated as it travels through the heat harvester, and exit at a temperature close to that of the rock. The heat harvester can be a closed loop to prevent fluid loss. In an example configuration where the heat harvester is fully cased, the environmental impact stemming from leaching the host rock may be decreased or eliminated.

The working fluid can be heated as it travels through the heat harvester (e.g., in a loop). At least a portion of the working fluid (also "process fluid," "fluid," "primary fluid" and "heat harvesting fluid" herein) may be pressurized. For example, heated primary fluid can be under pressure sufficient to prevent boiling within the closed loop pipe system. Once at the surface, the heated primary fluid within the loop may be kept liquid by exchanging the harvested heat with a secondary process fluid. Alternatively or in combination, the heated primary fluid may be flashed to vapor (e.g., steam) at the surface. Surface equipment (e.g., surface power plant equipment or other surface mounted equipment) may be used to extract and/or convert energy from the heated primary fluid. The energy from the heated primary fluid may have various uses, including, but not limited to, electrical power generation, desalination, use as a high temperature heat source for industrial processes, co-generation, district heating and/or cooling, or any combination thereof. The energy harvested from the heated primary fluid may be from about 5 megawatts to 1 gigawatt. For example, the heated primary fluid may be directed to a turbine to generate power, or used to heat a secondary fluid which may be directed to a turbine to generate power.

The heat harvester can comprise an open loop heat harvester. In an open loop heat harvester configuration, the working fluid between an entrance and an exit of the heat harvester may flow in a closed piping system, and upon flowing through the exit of the heat harvester may be used by surface equipment to extract and/or convert energy from the working fluid. In some instances, the process of extracting and/or converting energy from the working fluid may lead to the working fluid not being fully recoverable; in such instances a source of new working fluid may be provided to supplement the working fluid lost due to the extracting and/or converting.

FIG. 1 is a schematic of example surface operations, showing two example methods of transferring heat extracted from an underground heat harvester 100. Surface operations may use surface mounted equipment (e.g., no underground pumps, no underground turbines and/or no underground valves). The surface mounted equipment may comprise surface mounted power plant equipment. The underground heat harvester may extend to a given depth. The depth may be defined as the distance measured from the surface of the rock in a vertical direction (i.e., a direction parallel to the gravity vector). A heated primary fluid 101 may be maintained in a liquid phase underground (e.g., no boiling while the primary fluid is underground in the heat harvester 100). In a first method (top), the heated primary fluid 101 may remain in a liquid state (e.g., does not undergo phase change from liquid to gas) upon exiting the underground heat harvester 100 (e.g., the heated primary fluid 101 remains in a liquid state in a heat exchanger). The heated primary fluid 101 exiting the underground heat harvester 100 may enter a heat exchanger (e.g., a surface heat exchanger) 104 and heat a cooler secondary process fluid 102 into a heated secondary process fluid 103. The heated primary fluid may remain in a liquid phase in the heat exchanger. The heated primary fluid 101 cools off in the surface heat exchanger 104 and then may enter a pressurizing tank 105. The pressurizing tank 105 may be a source for an injection pump 106, which may pump cooled primary fluid 107 back into the underground heat harvester 100. In a second method (bottom), heat may be transferred by flashing a heated primary fluid 108 exiting the underground heat harvester 100 through a throttling valve 109 into a flash drum 110, where steam is drawn off for plant use 111. A separate source of fluid or return fluid from the plant 112 may then be pressurized through an injection pump 113 which pumps cooled primary fluid 114 into the underground heat harvester 100.

Heat may be transferred to the heat harvester (e.g., to the heat harvesting portion of the heat harvester) via various heat transfer mechanisms (e.g., conduction, convection and/or radiation). Heat from distant rock may be transmitted to the heat harvester through conduction. Heat may be transmitted to the heat harvester through natural convection of water within a porous, water-saturated rock (e.g., after significant temperature gradients are developed around the heat harvester). Heat transfer to the heat harvester through convection of fluid(s) (e.g., water and/or other gaseous or liquid fluids) may be enhanced (e.g., by augmenting or cracking the surrounding rock prior to casing the well). The conductive property of rock surrounding the heat harvester may be enhanced through injection of conductive material (e.g., cement or grout). The injection may be implemented when completing the heat harvester (e.g., when completing the well).

The performance of the heat harvester can be improved by configuring the heat harvester (e.g., the heat harvesting portion) to given (e.g., local) geological and/or heat supply conditions (e.g., by shaping the design of the heat harvester to improve or optimize local geological and heat supply conditions). For example, diameter, borehole length and/or other characteristics of the heat harvester may be configured according to given geological and/or heat supply conditions. The heat harvester's heat transfer surface area (e.g., the surface area of the heat harvesting portion) can be increased by increasing the diameter, by extending the borehole length, or both. Increasing the borehole length can increase the volume of accessed rock. With recent improvements in drilling technology driven by the oil and gas industry resulting in significant reductions in drilling cost, increased drilling rates and increased precision in the control of directional drilling, limitations of rock thermal conductivity may be offset (e.g., at least partially offset) by creating a long, underground heat harvester.

The heat harvester (or individual portions thereof) can have a given diameter (e.g., borehole diameter or casing diameter). The diameter of the heat harvester may be similar to borehole and/or casing sizes of a typical oil and gas or geothermal well. The diameter of various portions of the heat harvester may or may not be the same. For example, a borehole in a well portion may be greater than or equal to a borehole in a heat harvesting portion (e.g., since a borehole in the well portion may comprise one or more casings while a borehole in the heat harvesting portion may comprise a single casing). A diameter of the borehole can be greater than or equal to about 8 inches. In some cases, the diameter of the borehole may be significantly greater than 8 inches (e.g., as a result of improved drilling technology). In some examples, the diameter of the borehole may be greater than or equal to about 6 inches, 7 inches, 7⅝, 8 inches, 9 inches, 10 inches, 11 inches, 12 inches, or 36 inches. A diameter of the casing may be less than or equal to about 7⅝ inches. In some cases, the diameter of the casing may be significantly less than 7⅝ inches (e.g., where coil-tubing utilization in the heat harvesting portion is feasible). In some examples, the diameter of the casing may be less than or equal to about 8 inches, 7⅝ inches, 7 inches, 6 inches, 5 inches, 4 inches or 3 inches (e.g., the diameter in the well portion may vary in accordance with American Petroleum Institute (API) standards for oil well casings).

Heat harvesters can be installed in (e.g. drilled through) rock of a target temperature. The target temperature may be relatively constant at a target depth. The target temperature and depth may define a primary heat transfer region (also "target heat exchange region" herein). The target temperature may be, for example, between about 100° C. and about 500° C. The target temperature may also be, for example, between about 200° C. and about 400° C. The target temperature may be at least about 100° C., 150° C., 200° C., 250° C., 300° C., 350° C. or 400° C. The target temperature may be less than about 500° C., 450° C., 400° C., 350° C., 300° C., 250° C. or 200° C. The target depth (e.g., for the primary heat transfer region) may be, for example, between about 0.5 kilometers (km) and about 12 km, between about 2 kilometers (km) and about 7 km, or between about 2 km and 10 km. The target depth may be at least about 0.5 km, 1 km, 2 km, 3 km, 4 km, 5 km, 6 km, 7 km, 8 km, 9 km, 10 km or 12 km. The target depth may be less than about 12 km, 11 km, 10 km, 9 km, 8 km, 7 km, 6 km, 5 km, 4 km, 3 km, 2 km, 1 km or 0.5 km.

Figure 2:
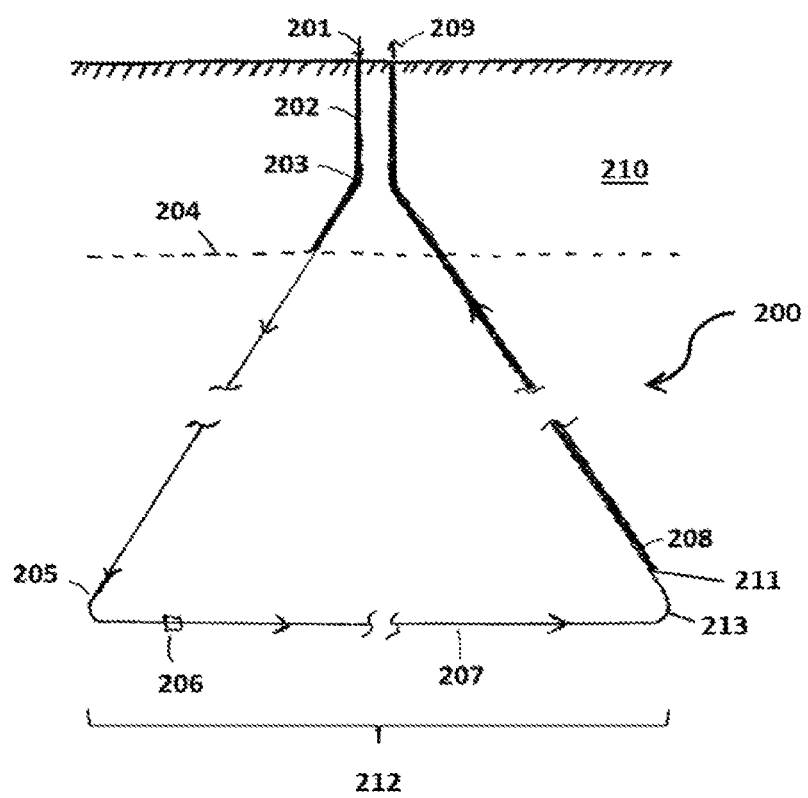
FIG. 2 is an elevation view of a triangle configuration.

The primary heat transfer region can comprise a rock region at a given depth (also "target depth" herein) and having a given horizontal length (e.g., horizontal length in a direction parallel to the plane of view in FIG. 2) and/or a given horizontal width (e.g., horizontal width in a direction perpendicular to the plane of view in FIG. 2). A geothermal heat harvester or a plurality of geothermal heat harvesters may target at least a portion of the primary heat transfer region (e.g., along the horizontal length, the horizontal width or both). The primary heat transfer region may or may not be centered with respect to the center of the heat harvester(s) and/or with respect to the location of the well entrance and/or exit portion(s)).

The length (and/or width) of the underground heat harvester may be a key driver of thermal performance. The length (and/or width) of the underground heat harvester can be extended as needed through directional drilling. Directional drilling can allow heat extraction to be increased or maximized by creating a heat harvester with sufficient length (and/or width) within a high temperature portion of the target formation (e.g., the primary heat transfer region). A heat harvester (e.g., a heat harvesting portion of the heat harvester) may have a horizontal length (and/or width) in the primary heat transfer region that is as long as economically feasible (e.g., related to horizontal drilling costs at depth). Such horizontal length (and/or width) in the primary heat transfer region may be configured based on geological considerations (e.g., avoidance of fault-lines, certain rock formations and/or property boundary lines). Thus, the horizontal length (and/or width) in the primary heat transfer region may be arbitrarily long subject to, for example, the aforementioned constraints. The horizontal length (and/or width) in the primary heat transfer region may vary depending on rock properties and heat supply conditions. A heat harvester may have a horizontal length (and/or width) in the primary heat transfer region of greater than or equal to about 100 meters (m), 200 m, 300 m, 500 m, 600 m, 700 m, 800 m, 900 m, 1 kilometer (km), 1.2 km, 1.4 km, 1.6 km, 1.8 km, 2 km, 2.5 km, 3 km, 3.5 km, 4 km, 4.5 km, 5 km, 5.5 km, 6 km, 6.5 km, 7 km, 7.5 km, 8 km, 8.5 km, 9 km, 9.5 km or 10 km. The horizontal length (and/or width) in the primary heat transfer region may be between about 3 km and 5 km, or between about 3 km and 10 km. The horizontal length (and/or width) in the primary heat transfer region may be greater than 10 km (e.g., if two separate directionally drilled portions of the heat harvester (e.g., comprising two separate directionally drilled well portions) are connected). In some cases, the horizontal length (and/or width) in the primary heat transfer region may be significantly greater than 10 km (e.g., as a result of improved drilling and casing installation technology).

The layout of the heat harvester (also "underground heat harvester" herein) can be configured to increase or optimize performance within a given (e.g., particular) geological resource. For example, the heat harvester may be drilled in a triangular shape or in a flower petal shape, as described in greater detail elsewhere herein.

Multiple heat harvesters may operate together. As described in greater detail elsewhere herein, multiple heat harvesters may operate independently (e.g., each comprising separate entrance, exit and/or other portions), co-dependently (e.g., at least a portion of the heat harvesters can share entrance, exit and/or other portions), or a combination thereof. In some embodiments, multiple heat harvesters may operate independently in a field configuration. A field of heat harvesters can be shaped in various ways to increase or maximize heat extraction as a system (e.g., the heat harvesting portions can be shaped to increase or maximize heat extraction as a system). In some embodiments, multiple heat harvesters may operate co-dependently in a deviated configuration.

Heat harvesters may be constructed individually and/or in groups. Heat harvesters may be drilled in groups for economies of scale (e.g., in a field configuration). When grouped, heat harvesters can be drilled apart from each other at a suitable distance (e.g., at a distance sufficient to prevent overlapping regions of heat harvesting). For example, when grouped, deviating portions of individual heat harvesters can be suitably spaced apart in a horizontal direction (e.g., to prevent cooling overlap). Where portions of the heat harvesters are operating adjacent to each other, they may be operated in a counter-flow configuration. Operation in the counter-flow configuration may be advantageously used to offset thermal gradient(s) developed along the heat harvesters. For example, where heat harvesters (e.g., entrance and exit portions of the heat harvesters) are operating adjacent to each other, they may be operated in a counter-flow configuration (e.g., to offset axial thermal gradients developed along the length of each heat harvester due to the rock cooling more at respective entrances than at respective exits). In this example, operation of two adjacent portions of the heat harvesters (e.g., operation of two sets of adjacent entrance and exit portions) in the counter-flow configuration may create complementing axial thermal gradients along their lengths. Due to the working fluid (e.g., water) being colder at the injection point (entrance) of an individual heat harvester than at the production point (exit) of the individual heat harvester, the rock may cool more at the entrance than the exit of each heat harvester and develop a cone-shaped thermal depression. Operating two adjacent heat harvesters such that the injection and exit points alternate may allow the two heat harvesters to be spaced closer together (e.g., since the funnels of the thermal depression cones may not overlap).

Underground heat harvesting may be accomplished by drilling multiple heat harvesters from a common entrance and/or exit portion (also "main entrance and/or exit portion" and "single entrance and/or exit portion" herein). Such deviated configurations may allow drilling costs to be decreased or minimized. For example, a common entrance and exit portion may comprise a common well portion, one or more common connecting portions and/or a common heat harvesting portion. The common entrance and/or exit portion may be near a target heat exchange region, and deviating portions (also "deviated portions" herein) of the individual heat harvesters may be drilled from the common entrance and/or exit portion (e.g., to decrease or minimize drilling length).

Two independently drilled portions of the heat harvester (e.g., comprising two independently drilled well portions) can be connected with a coupling to create a complete loop of the underground heat harvester. For example, to allow rapid creation of the underground heat harvester, the entrance (e.g., an entrance well portion or a main entrance well portion) and the exit (e.g., an exit well portion or a main exit well portion) may be drilled simultaneously. Each well portion can be part of a separate portion of the heat harvester (e.g., of an entrance portion or an exit portion). Individual portions of the heat harvester (e.g., the entrance portion and the exit portion) can each comprise a casing. Where the two portions of the heat harvester converge, a coupling can be used to complete the joint between the two casings. The coupling may be positioned anywhere along the underground heat harvester, such as, for example, at the target depth or above the target depth.

A heat harvester may be drilled into a triangular shape (also "triangle shape" herein). In this configuration, the entrance and exit can be co-located and heat harvester length at the target temperature can be formed by drilling diagonally and then bending the borehole to create a linear stretch or segment of the heat harvester. In the triangle shape configuration, a kickoff depth (e.g., depth where the heat harvester transitions from a vertical to an angled or horizontal orientation) may be near the surface, or deeper underground. In some embodiments, at least a portion of the triangle shaped heat harvester may differ (e.g., the entrance well portion and the exit well portion can be configured differently while the heat harvester remains the same below the kickoff depth).

FIG. 2 is an elevation view of an example triangle configuration within a target formation (e.g., rock comprising a region suitable for geothermal heat harvesting). A primary fluid is injected at location 201 and enters a triangle underground heat harvester 200. The entering primary fluid may be warmer than surrounding rock 210. A thermally insulating cement or grout 202 may be used to decrease or prevent heat loss until, at a heating depth 204, the geothermal gradient results in a rock temperature that is higher than the entering primary fluid temperature. The borehole is kicked off (e.g., directed at an angle of at least about 0°, 5°, 10°, 15°, 20°, 25°, 30°, 35°, 40°, 45°, 50°, 55°, 60°, 65°, 70°, 75°, 80°, 85° or 90° with respect to the vertical direction) at a given depth (also "kickoff depth" herein) or position 203 to a buildup angle leading up to a target temperature (e.g., temperature of the rock at a given depth, such as, for example at a target depth, or temperature of the rock at a range of depths). The angle (also "buildup angle" herein) may or may not be constant between the kickoff depth and the target temperature depth(s). The buildup angle can be as sharp as allowed by state of the art drilling technology. As such, the angles shown in FIG. 2 may not be to scale. The kickoff depth 203 may be at least about 5%, 10%, 25%, 50% or 75% less than the heating depth 204. The kickoff depth may be about equal to the heating depth. The kickoff depth may be at least about 5%, 10%, 25%, 50% or 75% greater than the heating depth. A first sharp turn (e.g., with an inside angle of at least about 0°, 5°, 10°, 15°, 20°, 25°, 30°, 35°, 40°, 45°, 50°, 55°, 60°, 65°, 70°, 75°, 80°, 85° or) 90° may be introduced at location 205 where the heat harvester 200 reaches a primary heat transfer region at the target temperature and depth.

The heat harvester 200 extends through the target formation, and may use a thermally conductive cement or grout 207 along at least a portion (e.g., along greater than or equal to about 20%, 40%, 60%, 80%, 90% or 100%) of the primary heat transfer region. The heat harvester then makes a second sharp turn at location 213 (e.g., with an inside angle of at least about 0°, 5°, 10°, 15°, 20°, 25°, 30°, 35°, 40°, 45°, 50°, 55°, 60°, 65°, 70°, 75°, 80°, 85° or 90°) and builds up angle toward an exit of the heat harvester. A thermally insulating cement or grout 208 (e.g., same or different type than the insulating cement or grout 202) may be used (e.g., reintroduced) to decrease or prevent heat loss from the heated primary fluid into the cooler rock 210. The heated primary fluid exits the underground heat harvester at location 209 and can be used for processing (e.g., as discussed with reference to FIG. 1).

The heat harvester 200 can be drilled as two separate portions that intersect underground and are connected with a coupling 206 (e.g., respective casings of the two separate portions can be connected via the coupling). The coupling may be positioned anywhere along the underground heat harvester (e.g., at the target depth or above the target depth). In an example, the coupling may be located anywhere along a horizontal portion 212. In another example (not shown in FIG. 2), only one portion of the heat harvester is horizontally drilled and makes approximately a 110° turn from its horizontal length to meet with the second portion of the heat harvester which is drilled vertically.

With continued reference to FIG. 2, an entrance well portion of the heat harvester 200 may comprise the portion between the entrance or inlet location 201 and the kickoff depth 203. At least a portion (e.g., greater than or equal to about 20%, 40%, 60%, 80%, 90% or 100%) of the entrance well portion may comprise the insulating cement or grout 202. A first connecting portion of the heat harvester 200 may comprise the portion between the kickoff depth 203 and the heating depth 204. At least a portion (e.g., greater than or equal to about 20%, 40%, 60%, 80%, 90% or 100%) of the first connecting portion may comprise the insulating cement or grout 202. A heat harvesting portion of the heat harvester 200 may comprise the portion between the heating depth 204 and an insulation depth 211. At least a portion (e.g., greater than or equal to about 20%, 40%, 60%, 80%, 90% or 100%) of the heat harvesting portion may comprise the thermally conductive cement or grout 207. A second connecting portion of the heat harvester 200 may comprise the portion between the insulation depth 211 and the kickoff depth 203. At least a portion (e.g., greater than or equal to about 20%, 40%, 60%, 80%, 90% or 100%) of the second connecting portion may comprise the insulating cement or grout 208. An exit well portion of the heat harvester 200 may comprise the portion between the kickoff depth 203 and the exit or outlet location 209. At least a portion (e.g., greater than or equal to about 20%, 40%, 60%, 80%, 90% or 100%) of the exit well portion may comprise the insulating cement or grout 208. Together, the entrance well portion and the exit well portion may form a well portion. The well portion may comprise multi-stage casing (e.g., cemented or grouted in conventional way). At least a portion of the heat harvesting portion can collect or harvest the heat from the surrounding rock. The remaining (non-heat harvesting) portions of the heat harvester 200 may neither lose heat nor collect or harvest any additional heat. An entrance portion of the heat harvester 200 may comprise, for example, the entrance well portion and the first connecting portion, or the entrance well portion, the first connecting portion and at least a portion of the heat harvesting portion. An exit portion of the heat harvester 200 may comprise, for example, the second connecting portion and the exit well portion, or at least a portion of the heat harvesting portion, the second connecting portion and the exit well portion. Entrance and exit portions of the heat harvester may be symmetric such that the buildup angles and first and second sharp turns 205 and 213 are equal and/or such that the kickoff depths are equal. Alternatively, the entrance and exit portions may have different angles, turns and/or different kickoff depths.

The heat harvester 200 may be arranged in a once-through configuration (e.g., not pipe-in-pipe or U-bend). The heat harvester 200 may comprise a closed loop (e.g., no free migration through rock). The heat harvester 200 may comprise co-located well heads (e.g., allowing small surface site footprint). The heat harvester 200 may be directionally drilled (e.g., comprising significant horizontal length). Heat extracted using the heat harvester 200 may be used for industrial use. The heat harvester 200 may comprise two connected casings (e.g., connected with a coupling). The heat harvester 200 may comprise insulating and/or conductive cement/grout (e.g., versus standard cement/grout).

Figure 3:
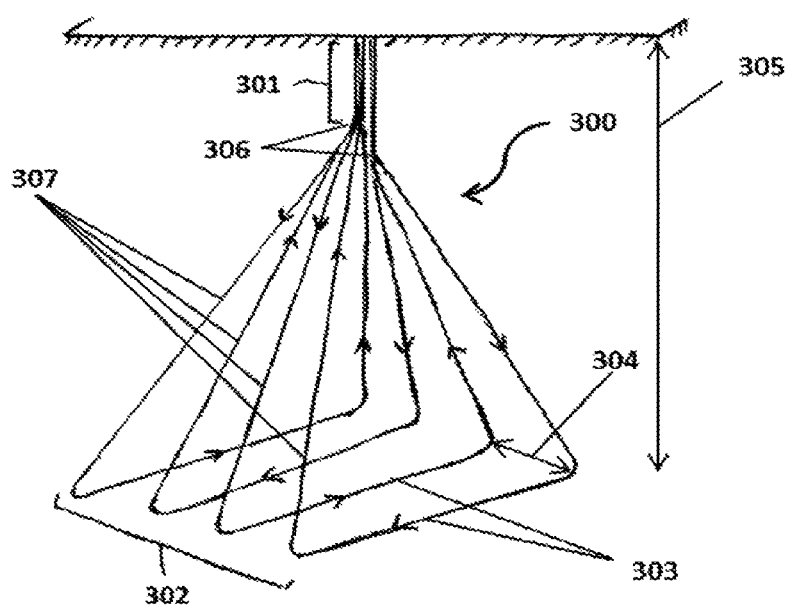
FIG. 3 is an isometric view of a triangle configuration with multiple individual heat harvesters in a field configuration.

FIG. 3 is an isometric view of a triangle configuration with multiple individual heat harvesters 307 in a field configuration 300. Individual heat harvesters 307 may be as described elsewhere herein (e.g., as described in relation to heat harvester 200 in FIG. 2). Multiple heat harvesters can be installed to extract heat from a large region of rock (e.g., from a large primary heat transfer region). In this example, multiple heat harvesters 307 are installed adjacent to each other with a common drill header 301 to centralize drilling and surface plant operations. The common drill header 301 may comprise entrance and exit well portions of the individual heat harvester 307 (e.g., one pair per each heat harvester 307). Individual heat harvesters 307 may have substantially the same or different configurations. For example, individual heat harvesters may have substantially the same or different kickoff depths 306. Once the collection of heat harvesters 307 reach a primary heat transfer region 302 (e.g., at a target depth 305), they can be linearly drilled with a spacing 304 (e.g, between about 10 meters (m) and about 1 kilometer (km), or between 50 m and 1 km, or at least 10 m, 20 m, 30 m, 40 m, 50 m, 100 m, 150 m, 200 m, 250 m, 300 m, 350 m, 400 m, 450 m, 500 m, 550 m, 600 m, 650 m, 700 m, 750 m, 800 m, 850 m, 900 m, 950 m or 1 km apart). The spacing 304 may be kept constant or varied. Within each heat harvester 307, working fluid may flow (e.g., be pumped) in a counter-flow configuration 303 (e.g., such that the working fluids in adjacent portions of the heat harvesters flow in opposite directions). The counter-flow configuration may reduce an axial thermal gradient.

The configuration 300 may comprise multiple heat harvesters operating together (e.g., important or necessary for economics). The configuration 300 may comprise a target heat exchange zone with significant length (e.g., of the heat harvesters 307) at depth. The configuration 300 may be arranged in a counter-flow configuration (e.g., to offset axial cooling). The multi-well header configuration 301 may be arranged in a central shaft. Illustrative examples of central shaft arrangements are set forth in U.S. Pat. No. 8,020,382, hereby incorporated by reference herein in its entirety.

A single triangle shape heat harvester may be extended into a radiator shaped multi-heat harvester. In this configuration, a single entrance portion can be drilled (e.g., at least in part at an angle) until reaching a given temperature and/or a given depth (e.g., until reaching a temperature within less than or equal to about 0%, 1%, 5%, 10%, 15%, 20%, 25%, 30%, 40% or 50% of the target temperature, and/or until reaching a depth within less than or equal to about 0%, 1%, 5%, 10%, 15%, 20%, 25%, 30%, 50% or 75% of the target depth). Several deviated portions of individual heat harvesters (e.g., comprising heat harvesting portions of the individual heat harvesters) can then be drilled directionally from the single entrance portion. Such deviated portions can extend through the length of rock near the target temperature and then re-converging to a single exit portion (e.g., an angled portion of the single exit portion).

Figure 4:
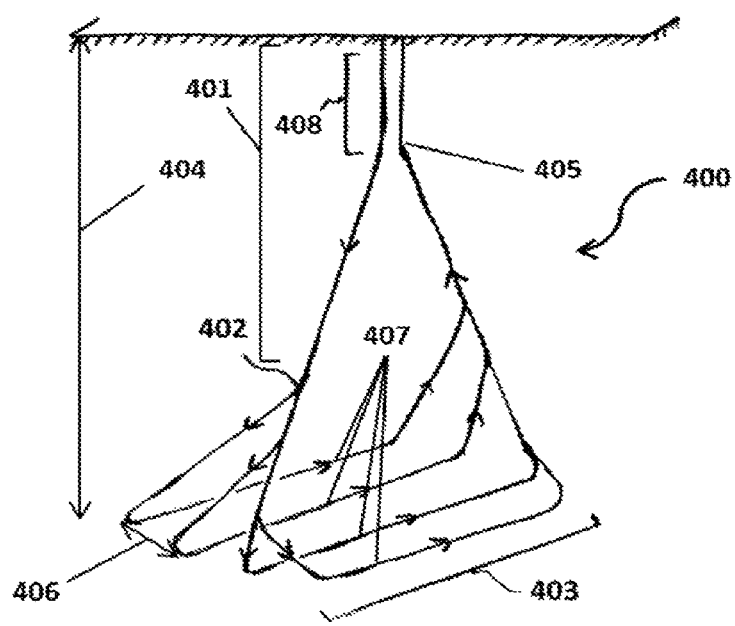
FIG. 4 is an isometric view of a triangle configuration with portions of individual heat harvesters deviating from common entrance and exit portions.

FIG. 4 is an isometric view of a triangle configuration 400 with portions of individual heat harvesters 407 deviating from common entrance and exit portions. The configuration 400 can be referred to as a radiator configuration. The radiator configuration may be used to reduce the amount of drilling required to create a heat transfer area in a primary heat transfer region 403. The configuration 400 may comprise several deviating portions of individual heat harvesters 407 (e.g., all connected as a closed loop) from the main entrance and exit portion (e.g., to reduce drilling length). At least one of the heat harvesters 407 may be configured as the heat harvester 200, with the remaining heat harvesters 407 deviating away from the plane of the heat harvester 200.

In this example, a single pair of entrance and exit portions 401 may be drilled, with multiple portions of individual heat harvesters 407 deviating at a given depth (also "deviation depth" herein) or position 402 from the main entrance and exit portions and extracting heat from the primary heat transfer region 403. The deviating portions of individual heat harvesters 407 can be linearly drilled with a spacing 406 (e.g, between about 10 m and about 1 km, or between 50 m and 1 km, or at least 10 m, 20 m, 30 m, 40 m, 50 m, 100 m, 150 m, 200 m, 250 m, 300 m, 350 m, 400 m, 450 m, 500 m, 550 m, 600 m, 650 m, 700 m, 750 m, 800 m, 850 m, 900 m, 950 m or 1 km apart) in the primary heat transfer region 403 (e.g., at a target depth 404). The deviating portions of individual heat harvesters 407 may be spaced to prevent cooling overlap. The spacing 406 may be kept constant or varied. Since working fluid flows in this example may not be configured in a counter-flow configuration, working fluid flow through the heat harvesters 407 may be periodically reversed to offset an axial thermal gradient.

The pair of entrance and exit portions 401 may have a kickoff depth 405. The kickoff depth 405 for the entrance and exit wells may or may not be the same. The deviation depth 402 for the entrance and exit portions may or may not be the same. The deviation depth may be greater than or equal to about 1, 2, 3, 4, 5, 6, 8 or 10 times the kickoff depth (e.g., located along an angled portion of the entrance and/or exit portion). The deviation depth may be within less than or equal to about 0%, 1%, 5%, 10%, 15%, 20%, 25%, 30%, 50% or 75% of the target depth.

The portions of the individual heat harvesters may deviate from the main entrance and/or exit portions at an angle of, for example, at least about 0°, 5°, 10°, 15°, 20°, 25°, 30°, 35°, 40°, 45°, 50°, 55°, 60°, 65°, 70°, 75°, 80°, 85° or 90° with respect to a direction of the main entrance and/or exit portions at the deviation depth. The deviation angle from the entrance portion and the deviation angle from the exit portion may or may not be the same. The deviation depth and/or deviation angle may be the same or different for different individual heat harvesters 407.

The pair of common entrance and exit portions 401 may comprise a common well portion 408. The common entrance and exit portions may each further comprise a common connecting portion and, in some cases, a common heat harvesting portion. The deviation depth 402 for an individual heat harvester 407 may be located in the common connecting portion or in the common heat harvesting portion. The deviating portion of the individual heat harvester 407 may comprise a heat harvesting portion of the individual heat harvester and, in some cases, one or more connecting portions of the individual heat harvester. Between the deviation depth 402 and the target depth 404 (on the entrance portion of the heat harvester 407), the deviating portion of the individual heat harvester 407 may comprise, for example, a heat harvesting portion and/or a connecting portion. At the target depth 404, the deviating portion of the individual heat harvester 407 may comprise a heat harvesting portion. Between the target depth 404 and the deviation depth 402 (on the exit portion of the heat harvester 407), the deviating portion of the individual heat harvester 407 may comprise a heat harvesting portion and/or a connecting portion. The deviating portions of the individual heat harvesters 407 may be configured in accordance with respective heating depth(s) and/or insulation depth(s) (e.g., as described elsewhere herein, for example, in relation to FIG. 2). In some examples, the heating depth may be less than or equal to the deviation depth. In some examples, the heating depth may be greater than the deviation depth. In some examples, the insulation depth may be less than or equal to the deviation depth. In some examples, the insulation depth may be greater than the deviation depth.

A set of heat harvesters may be drilled in a flower petal shape, with individual heat harvesters forming individual flower petals. An individual heat harvester may comprise entrance and exit portions drilled vertically or at an angle (e.g., at a slight angle, such as, for example, at an angle of at least about 0°, 5°, 10°, 15°, 20°, 25°, 30°, 35°, 40° or 45° with respect to the vertical direction) until reaching a target depth. The heat harvester may comprise a heat harvesting portion at the target depth. The entrance and exit portions can be located at the center of the flower petal shape. The entrance and exit portions can comprise, for example, a well portion, one or more connecting portions and, in some cases, at least a portion of the heat harvesting portion. A heating depth and an insulation depth may be located along the lengths of the entrance and exit portions. The heat harvester maybe configured in accordance with the heating depth and/or insulation depth (e.g., as described elsewhere herein, for example, in relation to FIG. 2). Such configuration may include, for example, use of conductive and/or insulating cement/grout. For example, the individual heat harvester may comprise a heat harvesting portion that extends down from the heating depth in the entrance portion, through a primary heat transfer region (e.g., at the target depth) and up to the insulation depth in the exit portion.

At or near the target depth, a first borehole (of the entrance portion) can be kicked off horizontally, drilled radially away from the center, and then drilled at an arc. A second borehole (of the exit portion) can be similarly drilled to finish the arc and complete the loop. A casing may be placed in each of the first and second boreholes. The first and second boreholes may be part of separate portions of the individual heat harvester. Such portions of the heat harvester may be joined by a coupling (e.g., the respective casings of the portions can be connected via the coupling). The coupling may be positioned anywhere along the underground heat harvester (e.g., at the target depth or above the target depth). For example, the coupling may be located anywhere along the radial and/or arc segments (e.g., along the heat harvesting portion at the target depth). In some embodiments, at least a portion of the individual flower petal shaped heat harvester may differ (e.g., the entrance and exit portions may be configured differently while the heat harvesting portion at the target depth remains substantially the same).

Figure 5:
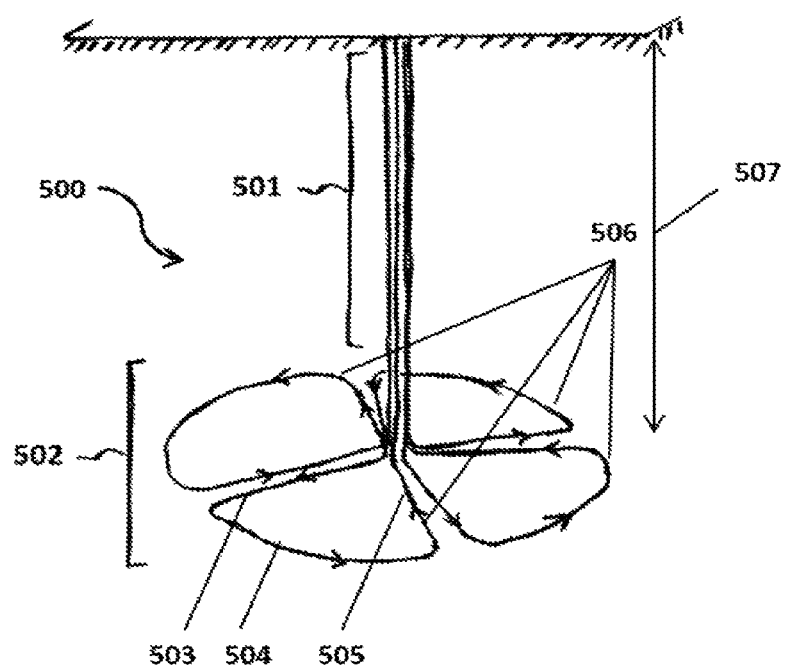
FIG. 5 is an isometric view of a flower petal configuration with multiple individual heat harvesters in a field configuration.

FIG. 5 is an isometric view of a flower petal configuration 500 with multiple individual heat harvesters 506 in a field configuration. Individual heat harvesters 506 may be as described elsewhere herein (e.g., as described in relation to individual heat harvesters forming individual flower petals). Individual heat harvesters 506 may have substantially the same or different configurations. The configuration 500 may allow the amount of drilling required to create a heat transfer area in a primary heat transfer region 502 to be reduced (e.g., drilling length to reach target temperature can be minimized). The configuration 500 can comprise one or more (e.g., at least 1, 2, 3, 4, 5, 6, 7, 8, 9 or 10) individual heat harvesters 506, each comprising a flower petal shaped heat harvesting portion in the primary heat transfer region 502 (e.g., at a target depth 507). For example, the configuration 500 can comprise 4 individual heat harvesters 506, each comprising a flower petal shaped heat harvesting portion in the primary heat transfer region that spans a quarter circle. The heat harvesters 506 may be spaced to decrease or prevent cooling overlap.

In this example, multiple entrance and exit portions 501 (e.g., one pair per each heat harvester 506) are drilled until reaching the target temperature and depth zone 502 (e.g., a target depth 507). The entrance and exit portions 501 can be located at the center of the configuration 500. Each pair of entrance and exit portions can comprise a well portion. The multiple well portions of the configuration 500 can be installed adjacent to each other using a multi-well header configuration. The multi-well header configuration may be arranged in a central shaft. Illustrative examples of central shaft arrangements are set forth in U.S. Pat. No. 8,020,382, hereby incorporated by reference herein in its entirety.

Each heat harvester can then be drilled radially along segment 503 (e.g., outward from the entrance and exit portions 501), arc (e.g., for a given distance) along segment 504 and then return radially to the center of the system along segment 505. Angles of curvature in the primary heat transfer region 502 (e.g., at least about 0°, 5°, 10°, 15°, 20°, 25°, 30°, 35°, 40°, 45°, 50°, 55°, 60°, 65°, 70°, 75°, 80°, 85° or 90°) can be as sharp as allowed by state of the art drilling technology. As such, the angles shown in FIG. 5 may not be to scale. Radii of curvature in the primary heat transfer region 502 may include build angles of between about 1 and 10 degrees per 100 feet (e.g., at least about 1°/100 feet, 2°/100 feet, 3°/100 feet, 4°/100 feet, 5°/100 feet, 6°/100 feet, 7°/100 feet, 8°/100 feet, 9°/100 feet or 10°/100 feet). The heat harvesters 506 may or may not have the same angle and/or curvature. At least a portion (e.g., all) of the heat harvesters may have substantially similar angle and/or curvature, or at least a portion of the heat harvesters may have one or more different angles and/or curvatures.

The collection of heat harvesters 506 may or may not be arranged in a common horizontal plane in the primary heat transfer region 502. The collection of heat harvesters 506 may deviate from a common horizontal plane to accommodate given (e.g., particular) geological or drilling details. Working fluid may flow in adjacent heat harvesters in a counter-flow configuration (e.g., such that the working fluids in adjacent portions of the heat harvesters flow in opposite directions). The counter-flow configuration may reduce or minimize an axial thermal gradient.

Multiple heat harvesters may be installed to form a flower petal shape in a deviated configuration, where multiple deviating portions of the individual heat harvesters extend from a main entrance portion, arc at a distance from the entrance portion, and then radially return to re-converge at a main exit portion.

Figure 6:
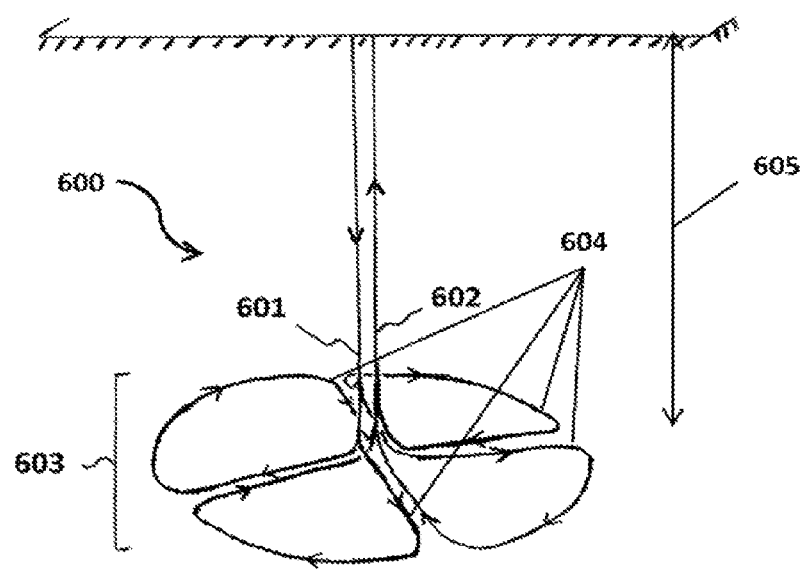
FIG. 6 is an isometric view of a flower petal configuration with portions of individual heat harvesters deviating from common entrance and exit portions.

FIG. 6 is an isometric view of a flower petal configuration 600 with portions of individual heat harvesters 604 deviating from common entrance and exit portions 601 and 602. The portions of the individual heat harvesters 604 may deviate radially toward a horizontal plane. The configuration 600 may comprise multiple deviated portions of individual heat harvesters 604 (e.g., all connected as a closed loop) from the main entrance and exit portion (e.g., to reduce drilling length). By creating deviated portions of individual flower petal shaped heat harvesters 604 from a main entrance portion 601 and a main exit portion 602, the amount of drilling required to create a heat transfer area in a primary heat transfer region 603 (e.g., at a target depth 605) may be further reduced.

The portions of the heat harvesters 604 may deviate from the main entrance portion 601 and a main exit portion 602 at a deviation depth. The deviation depth for the entrance and exit portions may or may not be the same. The deviation depth may be within less than or equal to about 0%, 1%, 5%, 10%, 15%, 20%, 25%, 30%, 50% or 75% of the target depth. The deviation depth may be the same or different for different individual heat harvesters 604. The portions of the individual heat harvesters may deviate from the main entrance and/or exit portions at an angle of, for example, at least about 0°, 5°, 10°, 15°, 20°, 25°, 30°, 35°, 40°, 45°, 50°, 55°, 60°, 65°, 70°, 75°, 80°, 85° or 90° with respect to a direction of the main entrance and/or exit portions at the deviation depth. The deviation angle may be as steep as allowed by directional drilling technology. The deviation angle may be configured to decrease or minimize the amount of drilling length necessary to get to a horizontal orientation (e.g., the bend may be tight). The deviation angle from the entrance portion and the deviation angle from the exit portion may or may not be the same. The heat harvesters may deviate in an arc (e.g., not at a constant angle). The deviation may have a curvature (e.g., a radius of curvature specified in terms of a build angle). The deviation may have a build angle of between about 1 and 10 degrees per 100 feet (e.g., at least about 1°/100 feet, 2°/100 feet, 3°/100 feet, 4°/100 feet, 5°/100 feet, 6°/100 feet, 7°/100 feet, 8°/100 feet, 9°/100 feet or 10°/100 feet). The deviation curvature from the entrance portion and the deviation curvature from the exit portion may or may not be the same.

The common entrance and exit portions 601 and 602 may comprise a common well portion. The common entrance and exit portions 601 and 602 may each further comprise a common connecting portion and, in some cases, a common heat harvesting portion. The deviation depth for an individual heat harvester 604 may be located in the common connecting portion or in the common heat harvesting portion. The deviating portion of the individual heat harvester 604 may comprise a heat harvesting portion of the individual heat harvester and, in some cases, one or more connecting portions of the individual heat harvester. Between the deviation depth and the target depth 605 (on the entrance portion of the heat harvester 604), the deviating portion of the individual heat harvester 407 may comprise, for example, a heat harvesting portion and/or a connecting portion. At the target depth 605, the deviating portion of the individual heat harvester 604 may comprise a heat harvesting portion. Between the target depth 605 and the deviation depth (on the exit portion of the heat harvester 604), the deviating portion of the individual heat harvester 604 may comprise a heat harvesting portion and/or a connecting portion. The deviating portions of the individual heat harvesters 604 may be configured in accordance with respective heating depth(s) and/or insulation depth(s) (e.g., as described elsewhere herein, for example, in relation to FIG. 2). In some examples, the heating depth may be less than or equal to the deviation depth. In some examples, the heating depth may be greater than the deviation depth. In some examples, the insulation depth may be less than or equal to the deviation depth. In some examples, the insulation depth may be greater than the deviation depth.

Angles of curvature in the primary heat transfer region 603 (e.g., at least about 0°, 5°, 10°, 15°, 20°, 25°, 30°, 35°, 40°, 45°, 50°, 55°, 60°, 65°, 70°, 75°, 80°, 85° or 90°) can be as sharp as allowed by state of the art drilling technology. As such, the angles shown in FIG. 6 may not be to scale. Radii of curvature in the primary heat transfer region 603 may include build angles of between about 1 and 10 degrees per 100 feet (e.g., at least about 1°/100 feet, 2°/100 feet, 3°/100 feet, 4°/100 feet, 5°/100 feet, 6°/100 feet, 7°/100 feet, 8°/100 feet, 9°/100 feet or 10°/100 feet).

The heat harvesters 604 may or may not have the same angle and/or curvature. At least a portion (e.g., all) of the heat harvesters may have substantially similar angle and/or curvature, or at least a portion of the heat harvesters may have one or more different angles and/or curvatures.

The collection of heat harvesters 604 may or may not be arranged in a common horizontal plane in the primary heat transfer region 603. The collection of heat harvesters 604 may deviate from a common horizontal plane to accommodate given (e.g., particular) geological or drilling details. The heat harvesters can collect heat from the primary heat exchange region 603, where adjacent heat harvesters can be operated in a counter-flow configuration (e.g., such that the working fluid in adjacent portions of the heat harvesters flows in opposite directions). The counter-flow configuration may reduce an axial thermal gradient.

Thermal conductivity may be a critical component of the overall performance of the heat harvester. Boreholes may be directionally drilled through rock with known high conductivity to increase or maximize thermal production. For example, high conductivity veins of rock can be targeted with directional drilling to increase or maximize the heat extraction rate. Rock may be targeted selectively.

Figure 7:
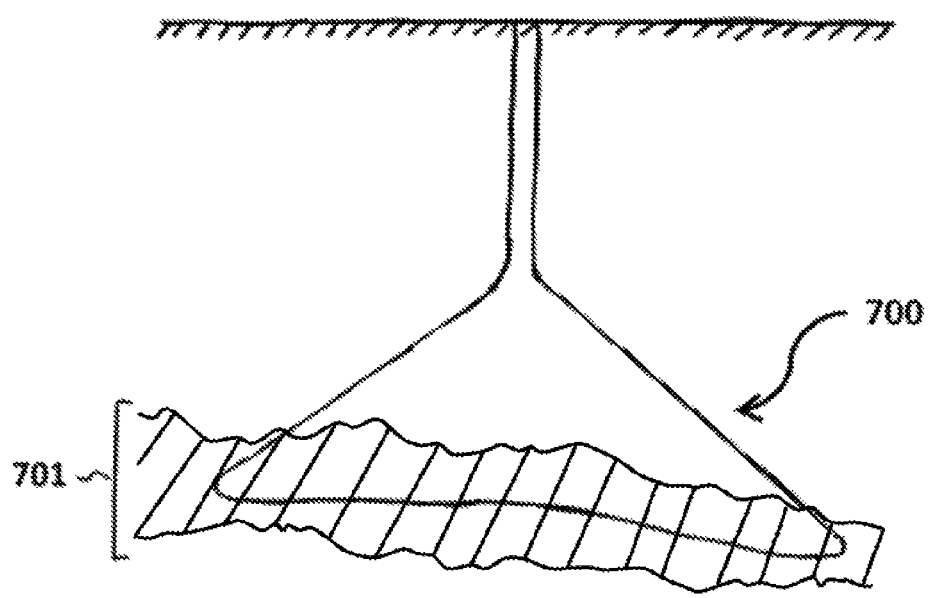
FIG. 7 is an elevation view of a closed loop heat harvester directionally drilled through a vein of rock with high thermal conductivity.

FIG. 7 is an elevation view of a closed loop heat harvester 700 directionally drilled through a vein of rock with high thermal conductivity. A high thermal conductivity vein of rock 701 can be targeted with one or more triangular shaped heat harvesters 700 (e.g., triangular shaped heat harvester 200 in FIG. 2). A similar strategy can be used to target a high thermal conductivity disc of rock using one or more flower petal shaped heat harvesters (e.g., collection of flower petal shaped heat harvesters 506 in FIG. 5 or 604 in FIG. 6). Thermally conductive rock may be targeted (e.g., to improve or optimize performance within a given rock formation). The heat harvester(s) 700 may drilled through virgin rock (e.g., not through an oil and gas well).

The rock immediately around the heat harvester (e.g., around the heat harvesting portion of the heat harvester) may be at its native temperature (e.g., at least about 100° C.) at the beginning of life (BOL), but may rapidly cool after the introduction of cold working fluid (e.g., cold water). A power spike may occur at the BOL (e.g., during extraction of heat from non-porous rock). The heat extracted by the harvesting portion after the rapid cooling phase may be driven by conduction through the rock. The amount of heat extracted by the heat harvesting portion after the rapid cooling phase may exponentially decrease and level off over time (e.g., after a few years). The rock may develop a thermal depression around the heat harvesting portion (e.g., as a result of the rapid cooling). By adjusting the fluid flow rate entering the underground heat harvester, heat extraction rate may be leveled over life (e.g., such that the heat extraction rate is suitable for operation of a power plant configured for baseload power). Such flow control may be achieved by a variable speed pump, by throttling pump flow with a throttling valve and/or by other suitable approaches. In an example, flow control over life may comprise providing a low flow rate at the BOL of the heat harvester and gradually increasing the flow rate over the lifetime of the heat harvester. Flow rates may range from between about 5 kg/s and 100 kg/s, or be at least 1 kg/s, 5 kg/s, 10 kg/s, 15 kg/s, 20 kg/s, 25 kg/s, 30 kg/s, 35 kg/s, 40 kg/s, 45 kg/s, 50 kg/s, 55 kg/s, 60 kg/s, 65 kg/s, 70 kg/s, 75 kg/s, 80 kg/s, 85 kg/s, 90 kg/s, 95 kg/s or 100 kg/s.

Cement or grout can fill the annular space between the casing and the rock (e.g., the space between the outer diameter of the casing and the borehole). The cement or grout may be modified to have insulating properties or conductive properties. Thermally conductive cement or grout (also "conductive cement/grout" herein) can increase or improve the rate of energy extraction from the target rock (e.g., increase or improve flow of heat into the heat harvester in a primary heat transfer region). Thermally insulating cement or grout (also "insulating cement/grout" herein) can decrease or minimize heat loss from the heat harvester (e.g., decrease or prevent loss of heat whenever the fluid is hotter than the surrounding rock). Insulating cement/grout may be used to decrease or prevent heat loss from entering fluid (e.g., working fluid that has not been heated and is flowing in a direction from the entrance at the surface toward the target depth) when it is at a greater temperature than the surface rock (e.g., rock at or near the surface or at a depth substantially less than the target depth). Insulating cement/grout may be used to prevent heat loss from exiting heated fluid which is rising to the surface to exit the underground heat harvester (e.g., working fluid that has been heated and is flowing in a direction from the target depth toward the exit at the surface).

Systems of the disclosure may be applied to perform various geothermal heat harvesting methods. For example, systems of the disclosure may be used to transfer heat extracted from the an underground heat harvester (e.g., using the system of FIG. 1), to drill underground heat harvesters in various configurations (e.g., see FIGS. 2-7), to extract heat from a large region of rock by drilling multiple heat harvesters (e.g., using the system of FIG. 3), to reduce (e.g., to varying degrees) the amount of drilling required to create a heat transfer area in a primary heat transfer region (e.g., using the systems of FIG. 4, 5 or 6), to target a high thermal conductivity vein of rock with one or more heat harvesters (e.g., using the system of FIG. 7), and so on.

Different aspects of the invention can be appreciated individually, collectively, or in combination with each other. Further, various aspects of the disclosure may be advantageously adapted to different heat harvester configurations. For example, the heat harvester may comprise a coaxial pipe-in-pipe (e.g., closed loop pipe-in-pipe), which may decrease or minimize drilling costs by pumping fluid through an outer annulus of the well with the heated fluid returning through an insulated center pipe. Such a heat harvester may be installed in a triangle shape or a flower petal shape. Various aspects of the disclosure may be advantageously applied in open loop configurations, closed loop U-bend and/or otherwise shaped (e.g., otherwise shaped once-through) configurations, configurations with underground equipment, closed loop configurations with augmented rock, oil and gas wells, and/or other configurations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A geothermal heat harvesting system, comprising:
a geothermal heat harvester comprising an entrance and an exit at a surface, wherein the entrance and the exit are in fluid communication via a path, the path comprising:
    a first segment extending between the surface and a target depth, the first segment comprising the entrance;
    a second segment in fluid communication with the first segment and extending radially outward at the target depth, the second segment being substantially perpendicular to the first segment;
    a third segment in fluid communication with the second segment and extending in an arc at the target depth;
    a fourth segment in fluid communication with the third segment and extending radially inward at the target depth; and
    a fifth segment extending between the target depth and the surface, the fifth segment comprising the exit and being substantially perpendicular to the fourth segment,
    wherein the second segment, the third segment, and the fourth segment (i) are substantially planar at the target depth and (ii) together comprise a primary heat transfer region, wherein the first segment and the fifth segment are each substantially vertical, and wherein the second segment and the fourth segment are each substantially horizontal.

2. The geothermal heat harvesting system of claim 1, wherein the path comprises two independently drilled portions connected with a coupling.

3. The geothermal heat harvesting system of claim 2, wherein the coupling is at the target depth.

4. The geothermal heat harvesting system of claim 2, further comprising:
    a sixth segment between the first segment and the second segment, the sixth segment deviating from the first segment toward the second segment; and
    a seventh segment between the fourth segment and the fifth segment, the seventh segment deviating from the fifth segment toward the fourth segment.

5. The geothermal heat harvesting system of claim 4, further comprising an additional geothermal heat harvester deviating from the geothermal heat harvester, the additional geothermal heat harvester comprising:
    an eighth segment in fluid communication with the first segment;
    a ninth segment in fluid communication with the eighth segment and extending radially outward at the target depth, the ninth segment being substantially perpendicular to the first segment and the eighth segment deviating from the first segment toward the ninth segment;
    a tenth segment in fluid communication with the ninth segment and extending in an arc at the target depth;
    an eleventh segment in fluid communication with the tenth segment and extending radially inward at the target depth, the eleventh segment being substantially perpendicular to the fifth segment; and
    a twelfth segment in fluid communication with the eleventh segment and the fifth segment, the twelfth segment deviating from the fifth segment toward the eleventh segment.

6. The geothermal heat harvesting system of claim 5, wherein the ninth segment and the eleventh are each substantially horizontal.

7. The geothermal heat harvesting system of claim 6, wherein horizontal portions of the geothermal heat harvester and the additional geothermal heat harvester are rotated by about 45°, 90°, or 135° from each other.

8. The geothermal heat harvesting system of claim 1, wherein the path forms a closed loop.

9. The geothermal heat harvesting system of claim 1, wherein the entrance and the exit are co-located.

10. The geothermal heat harvesting system of claim 9, wherein the path comprises two portions, wherein a first portion of the two portions comprises a well head that forms the entrance, and wherein a second portion of the two portions comprises a well head that forms the exit.

11. The geothermal heat harvesting system of claim 1, further comprising insulating cement or grout disposed along at least a portion of the path, conductive cement or grout disposed along at least a portion of the path, or a combination thereof.

12. The geothermal heat harvesting system of claim 1, further comprising a primary fluid that flows through at least a portion of the path, wherein the primary fluid is configured to enter at the entrance and exit at the exit, and wherein a flow rate of the primary fluid is configured for control over a life of the geothermal heat harvester such that a heat extraction rate from the geothermal heat harvester is leveled through the life.

13. The geothermal heat harvesting system of 1, further comprising an additional geothermal heat harvester operating together with the geothermal heat harvester in a field configuration, the additional geothermal heat harvester comprising a separate path with substantially the same configuration as the path of the geothermal heat harvester.

14. The geothermal heat harvesting system of claim 13, wherein the additional geothermal heat harvester is adjacent to the geothermal heat harvester, wherein the geothermal heat harvester is configured to circulate a first primary fluid and the additional geothermal heat harvester is configured to circulate a second primary fluid in a counter-flow configuration with respect to the first primary fluid.

15. The geothermal heat harvesting system of claim 13, wherein the additional geothermal heat harvester and the geothermal heat harvester are spaced to prevent cooling overlap.

\* \* \* \* \*

UNITED STATES PATENT AND TRADEMARK OFFICE
CERTIFICATE OF CORRECTION

Page 1 of 1

PATENT NO. : 10,954,924 B2
APPLICATION NO. : 15/935241
DATED : March 23, 2021
INVENTOR(S) : Piotr D. Moncarz et al.

It is certified that error appears in the above-identified patent and that said Letters Patent is hereby corrected as shown below:

In the Claims

Column 22, Lines 33-35, Claim 6 should read as follows:
6. The geothermal heat harvesting system of claim 5, wherein the ninth segment and the eleventh segment are each substantially horizontal.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*